United States Patent
Zofchak et al.

(10) Patent No.: US 7,658,408 B2
(45) Date of Patent: Feb. 9, 2010

(54) AIRBAG ASSEMBLY

(75) Inventors: Steven R. Zofchak, Fenton, MI (US); Dennis Ames Burton, Fenton, MI (US)

(73) Assignee: Toyoda Gosei Co. Ltd., Hun Aichi (JP)

( * ) Notice: Subject to any disclaimer, the term of this patent is extended or adjusted under 35 U.S.C. 154(b) by 0 days.

(21) Appl. No.: 11/498,954

(22) Filed: Aug. 3, 2006

(65) Prior Publication Data
US 2008/0030008 A1  Feb. 7, 2008

(51) Int. Cl.
B60R 21/16  (2006.01)

(52) U.S. Cl. .................. 280/743.2; 280/743.1

(58) Field of Classification Search ............ 280/743.2, 280/743.1, 740, 742
See application file for complete search history.

(56) References Cited

U.S. PATENT DOCUMENTS

| | | | |
|---|---|---|---|
| 5,064,217 A | 11/1991 | Shiraki | |
| 5,348,343 A | 9/1994 | Hawthorn | |
| 5,630,614 A | 5/1997 | Conlee et al. | |
| 5,738,366 A | 4/1998 | Phillion | |
| 5,779,261 A | 7/1998 | Honda | |
| 5,823,566 A * | 10/1998 | Manire | 280/728.3 |
| 5,863,063 A | 1/1999 | Harrell | |
| 5,865,466 A * | 2/1999 | Yamamoto et al. | 280/743.1 |
| 6,099,028 A * | 8/2000 | Seifert | 280/728.3 |
| 6,168,187 B1 | 1/2001 | Yamada et al. | |
| 6,206,409 B1 * | 3/2001 | Kato et al. | 280/728.2 |
| 6,364,349 B1 | 4/2002 | Kutchey et al. | |
| 6,585,292 B2 * | 7/2003 | Abe et al. | 280/743.1 |
| 6,626,456 B2 | 9/2003 | Terbu et al. | |
| 6,631,920 B1 | 10/2003 | Webber et al. | |
| 6,669,229 B2 | 12/2003 | Thomas | |
| 6,874,810 B2 | 4/2005 | Soderquist | |
| 6,877,772 B2 | 4/2005 | Fischer et al. | |
| 6,942,242 B2 | 9/2005 | Hawthorn et al. | |
| 2003/0189319 A1 | 10/2003 | Soderquist | |
| 2004/0119267 A1 | 6/2004 | Cowelchuck et al. | |
| 2004/0195808 A1 | 10/2004 | Amamori | |

FOREIGN PATENT DOCUMENTS

| | | |
|---|---|---|
| JP | 7069149 | 3/1995 |
| JP | 10315889 | 12/1998 |

* cited by examiner

*Primary Examiner*—Eric Culbreth
(74) *Attorney, Agent, or Firm*—Carlson, Gaskey & Olds

(57) ABSTRACT

A cushion wrap is secured to a front panel portion of the airbag. Opposite ends of the cushion wrap are secured to the bracket, such that one portion of the cushion wrap tethers one portion of the airbag to the bracket, while another portion of the cushion wrap tethers another portion of the airbag to the bracket. Weakened portions are formed in at least one portion of the cushion wrap such that the cushion wrap restrains one portion of the airbag less than it restrains the other. This provides the ability to control the direction of the deployment of the airbag.

13 Claims, 5 Drawing Sheets

AIRBAG ASSEMBLY

BACKGROUND OF THE INVENTION

The present invention relates generally to airbags.

A cushion wrap is often placed around the cushion ("airbag") of an airbag assembly to hold the folded cushion in place against a retainer plate to await deployment. One end of the cushion wrap is anchored to the retainer plate. The free end of the cushion wrap is then stretched across the cushion for attachment to the opposite side of the retainer plate. The cushion wrap keeps the cushion contained against the retainer plate, but the particular folding of the cushion may be shifted and misaligned. For example, if the cushion is folded into two stacks, the two stacks may become interleaved or otherwise misfolded.

For driver's side airbags, there are competing considerations in determining how fast to inflate the airbag. On the one hand, the airbag should be inflated quickly so that it can get between the driver's body and the bottom of the steering wheel which will typically be the first point of contact. On the other hand, increasing the rate of inflation of the airbag increases the force with which the airbag contacts the driver's head.

SUMMARY OF THE INVENTION

In the present invention, the cushion wrap is secured to a front panel portion of the airbag. Opposite ends of the cushion wrap are secured to the bracket, such that one portion of the cushion wrap tethers one portion of the airbag to the bracket, while another portion of the cushion wrap tethers another portion of the airbag to the bracket. Weakened portions are formed in at least one portion of the cushion wrap such that the cushion wrap restrains one portion of the airbag less than it restrains the other. For example, tear seams can be formed in one portion of the cushion wrap so that it will release first under the pressure of the airbag and the airbag will expand in that direction first. In one embodiment, tear seams are formed on both sides of the connection point between the cushion wrap and the front panel portion of the airbag, but one of the tear seams is weaker than the other.

In the disclosed embodiment, the lower tear seam is weaker than the upper tear seam, so that the airbag expands downward first. This provides the early protection to the passenger's body from the lower end of the steering wheel, while holding back the upper portion of the airbag to reduce the force of the contact of the airbag with the driver's head.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENTS

Figure 1:
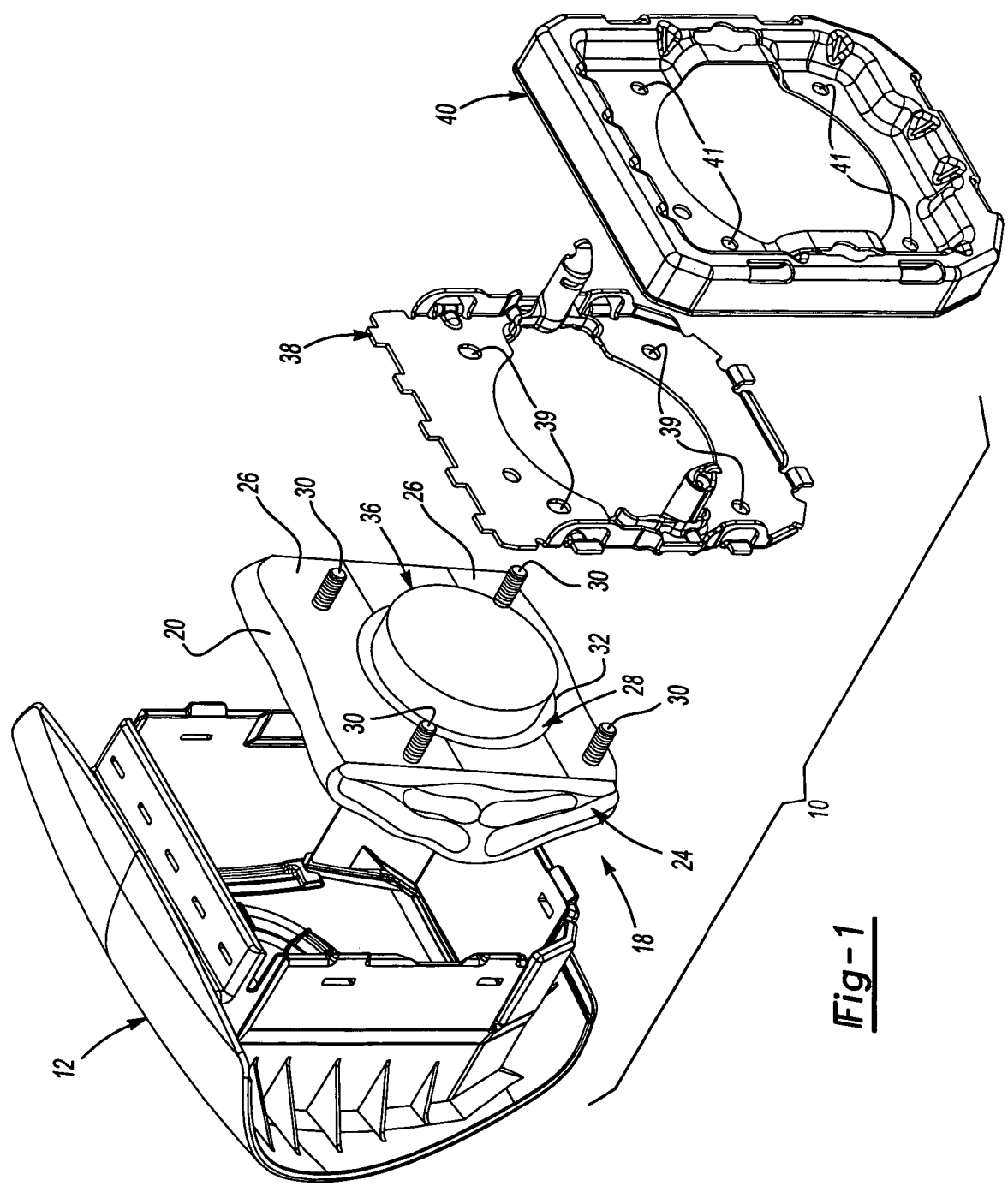
FIG. 1 is an exploded perspective view of an airbag module assembly.

FIG. 1 is an exploded, rear perspective view of an airbag module 10 including an airbag cover 12 and airbag assembly 18. The airbag assembly 18 includes a cushion wrap 20 retaining an airbag 24 to a retainer bracket 28. The retainer bracket 28 is disposed substantially inside the airbag 24 and includes bolts 30 protruding through the airbag 24 and through apertures in opposite ends 26 of the cushion wrap 20. The retainer bracket 28 includes an opening 32 for receiving an inflator 36.

A retainer plate 38 includes a plurality of apertures 39 for receiving the bolts 30 of the retainer bracket 28. A cover plate 40 also includes a plurality of apertures 41 for receiving the bolts 30.

Figure 2:
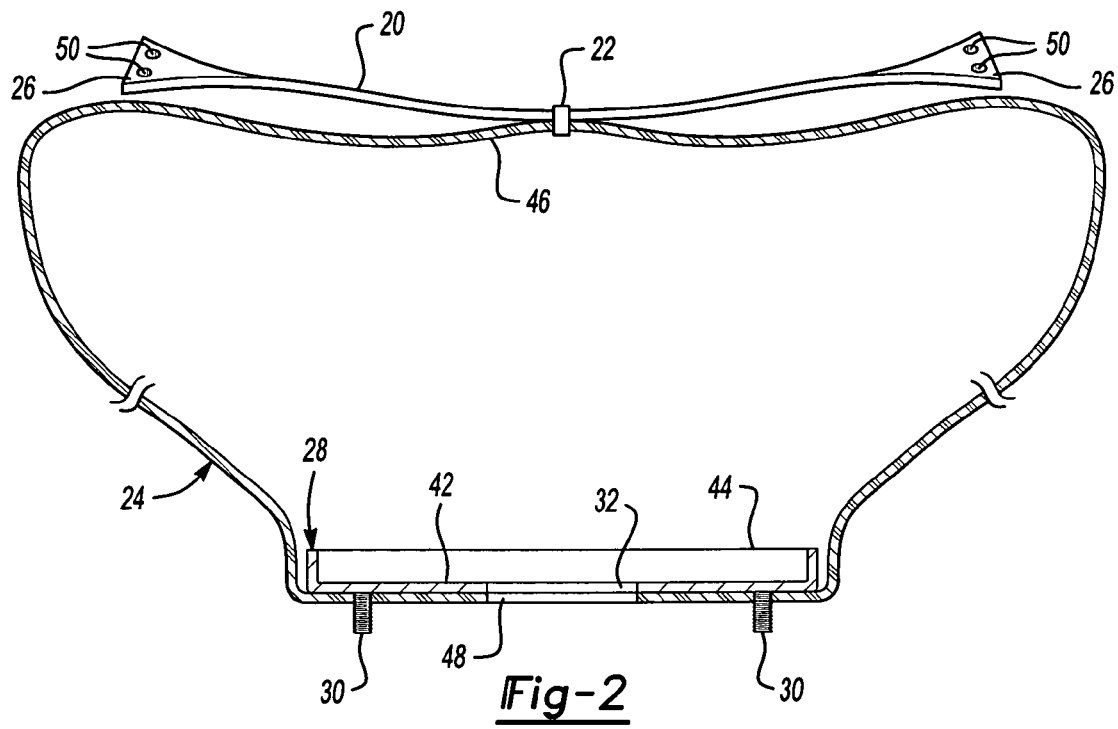
FIG. 2 is a section view of the airbag assembly of FIG. 1 prior to assembly.

FIG. 2 is a section view of the airbag assembly 18 of FIG. 1 prior to assembly. The retainer bracket 28 includes a generally planar base 42 and a wall 44 protruding upwardly from the perimeter of the base 42. The opening 32 for receiving the inflator 36 (FIG. 1) is formed through the base 42. The retainer bracket 28 is disposed substantially within the airbag 24, with only the bolts 30 protruding through a rear portion of the airbag 24 around a rear opening 48. The rear opening 48 is aligned with the opening 32 in the base 42 of the bracket 28, opposite a front panel portion 46 of the airbag 24. The cushion wrap 20 is secured to the front panel portion 46 of the airbag 24 such as by the thread 22, adhesive or other fastener. Opposite ends 26 of the cushion wrap 20 include apertures 50 for connection to the bolts 30.

Figure 3:
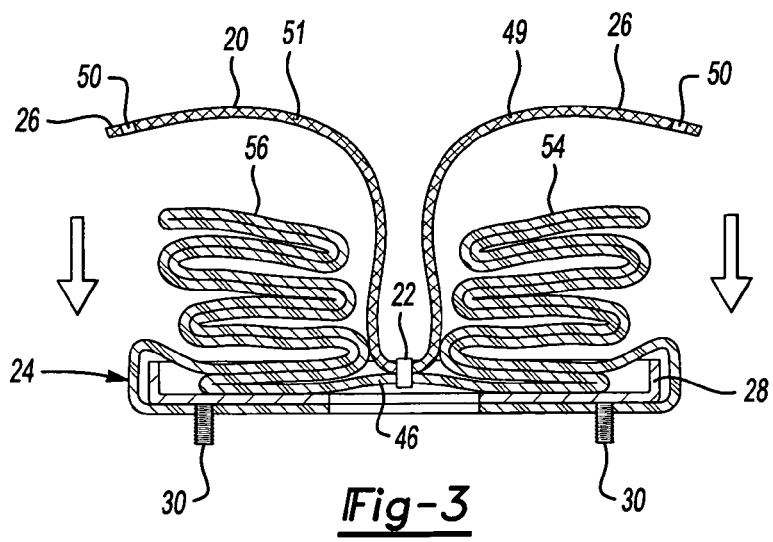
FIG. 3 is a section view through the airbag assembly of FIG. 2 during assembly.

FIG. 3 is a section view through the airbag assembly 18 of FIG. 2 during assembly. Although many arrangements are possible, the airbag 24 is folded onto the retainer bracket 28 in a first folded stack 54 and a second folded stack 56 with the front panel portion 46 below the first folded stack 54 and second folded stack 56. The cushion wrap 20 is attached to the front panel portion 46 of the airbag 34 between the first folded stack 54 and the second folded stack 56, such as by the thread 22.

Figure 4:
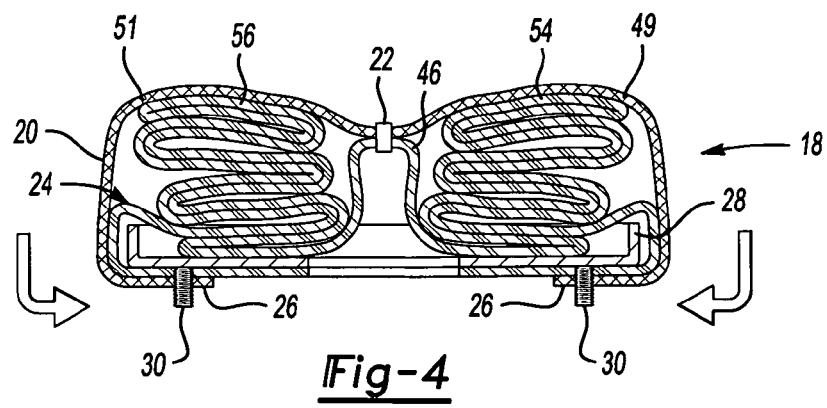
FIG. 4 is the airbag assembly of FIG. 3 after assembly is completed.

As the ends 26 of the cushion wrap 20 are pulled over the first folded stack 54 and the second folded stack 56, the front panel portion 46 is pulled upward between the stacks as shown in FIG. 4. This assists in keeping the stacks separate and intact. The ends 26 are secured to the bolts 30. The cushion wrap 20 keeps the airbag 24 folded and against the retainer bracket 28.

Figure 4A:
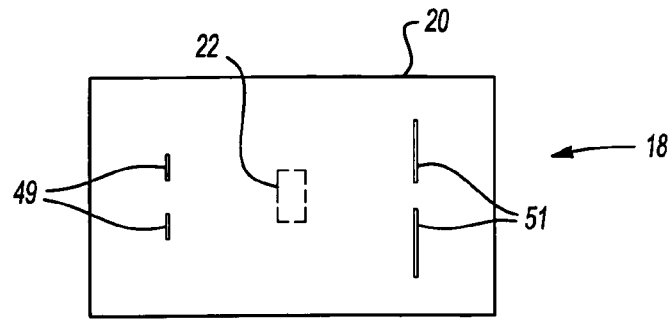
FIG. 4A is a front view of the airbag assembly of FIG. 4.

FIG. 4A is a front view of the airbag assembly 18 of FIG. 4. As will be explained below, the portion of the cushion wrap 20 between the thread 22 and one end 26 is weaker than the other. In the example shown, the cushion wrap 20 includes a pair of weakened portions, such as tear seams 49, 51 on either side of the connection (thread 22) to the airbag 24 (not visible in FIG. 4A). The tear seams 49 on one side are shorter than the tear seams 51 on the other side, therefore creating different tear strengths. The larger tear seams 51 make that side of the cushion wrap 20 weaker than the other.

Figure 5:
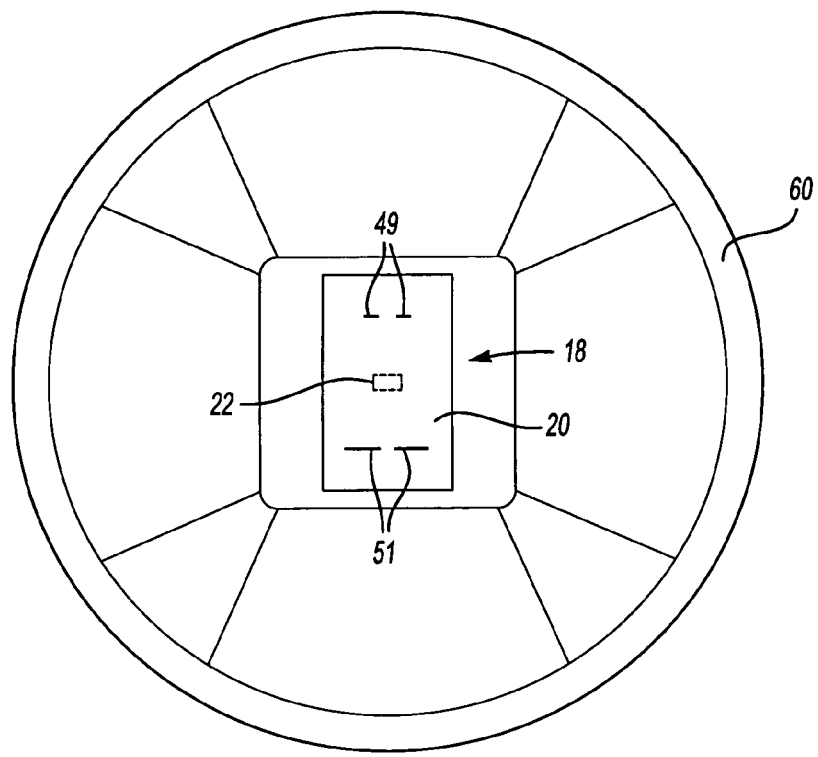
FIG. 5 is a front view of the assembly of FIG. 1 installed on a steering wheel.

FIG. 5 is a front view of the assembly of FIG. 1 installed on a steering wheel 60, but with the airbag cover 12 removed so that the airbag assembly 18 is visible. As shown, the airbag assembly 18 is preferably oriented with the weaker portion of the cushion wrap 20, with the longer tear seams 51, in a lower position (relative to the normal, straight position of the steering wheel 60).

Figure 6:
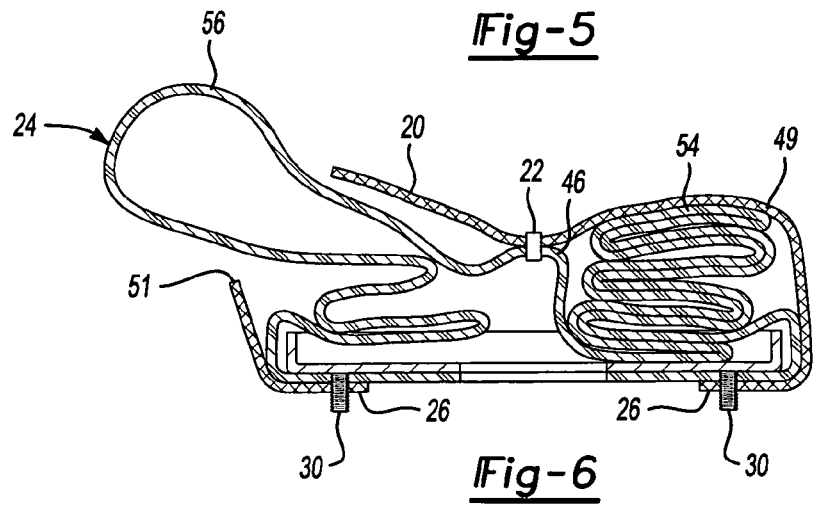
FIG. 6 is a section view, similar to that of FIG. 4, in the initial stages of airbag activation.
Figure 7:
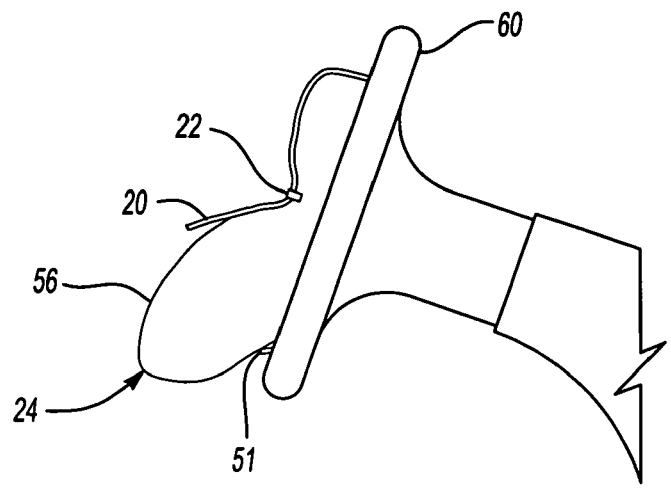
FIG. 7 is a side view of the steering wheel assembly of FIG. 5 during the initial stages of airbag activation.

Referring to FIGS. 6 and 7, during the initial stages of airbag 24 activation, the cushion wrap 20 will tear along the longer tear seams 51 first and the remaining cushion wrap 20 between the connection point (thread 22) and the opposite end 26 will temporarily restrain the other portion of the airbag 24, which in the example illustrated is the first folded stack 54. This forces the expanding gas into the second folded stack 56 first. As shown in FIG. 7, this corresponds to the lower portion of the airbag 24, so that the airbag 24 expands over the lower end of the steering wheel 60 first. By forcing the airbag 24 to expand over the lower end of the steering wheel 60 first, the overall inflation rate of the airbag 24 can be reduced, while still providing a cushion between the driver's abdomen and the lower end of the steering wheel 60 earlier in the crash.

Figure 8:
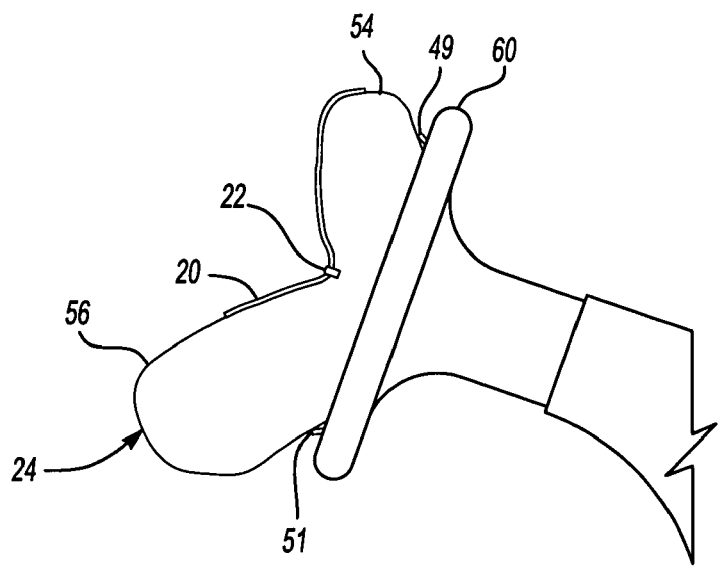
FIG. 8 is the steering wheel assembly of FIG. 7 in a second stage of airbag activation.
Figure 9:
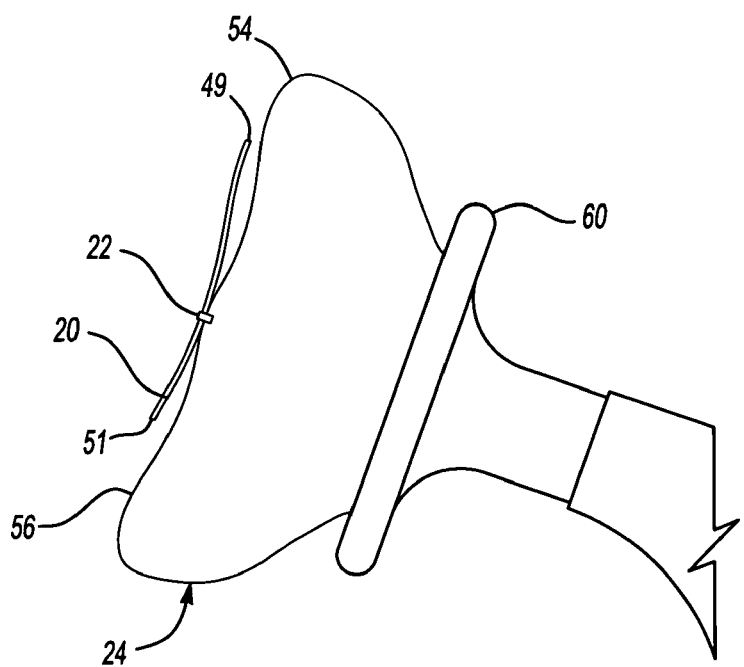
FIG. 9 is the steering wheel assembly of FIG. 8 in a third stage of airbag activation.

Referring to FIG. 8, after the second folded stack 56 of the airbag 24 is substantially inflated, the expanding gas forces the first folded stack 54 against the upper portion of the cushion wrap 20, tearing the cushion wrap 20 across the shorter tear seams 49. The first folded stack 54, the upper portion of the airbag 24, provides protection to the driver's upper body and head. The upper portion of the airbag 24 is deployed later than the lower portion of the airbag 24, because there is more time before contact between the upper body of the driver and the upper portion of the airbag 24. In FIG. 9 the airbag 24 is fully inflated, covering the entire steering wheel 60.

Figure 10:
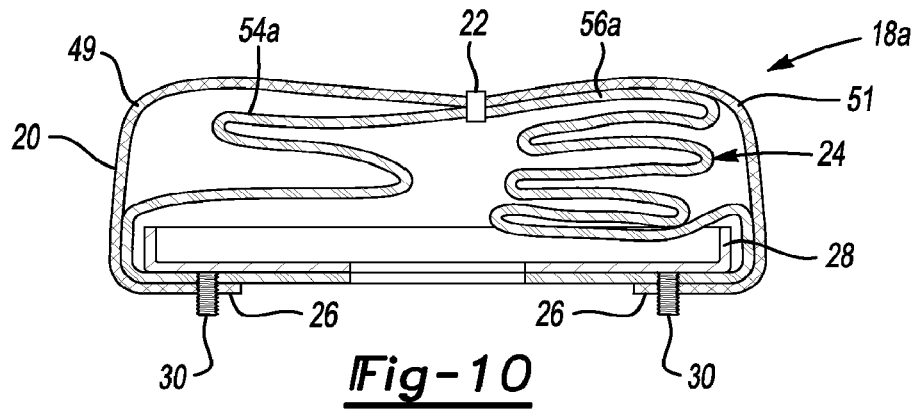
FIG. 10 is a section view of an airbag assembly according to a first alternate embodiment.
Figure 11:
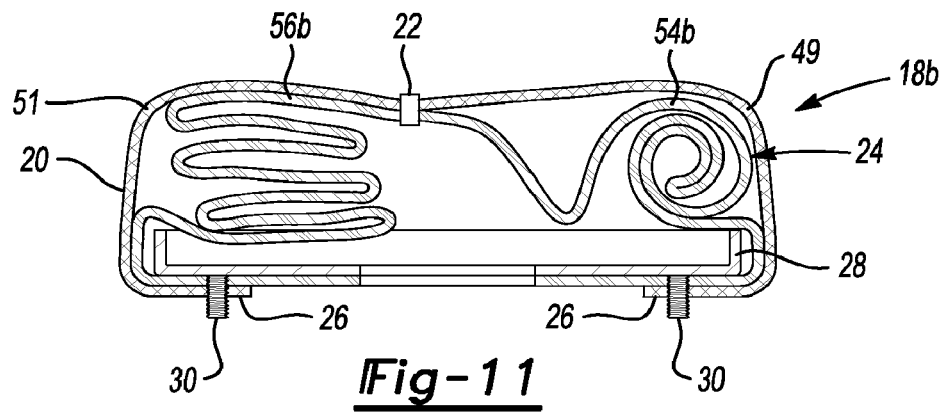
FIG. 11 is a section view of an airbag assembly according to a second alternate embodiment.

FIG. 10 is a section view of an airbag assembly 18a according to a first alternate embodiment. As shown, the cushion wrap 20 can be secured to the airbag 24 at a location other than the center of the front panel portion. The stacks 54a, 56a of folded portions of the airbag 24 need not be equal. As shown in another example airbag assembly 18b in FIG. 11, the stacks 54b, 56b can also be folded or rolled differently in various configurations to further control the direction of deployment of the airbag 24.

Figure 12:
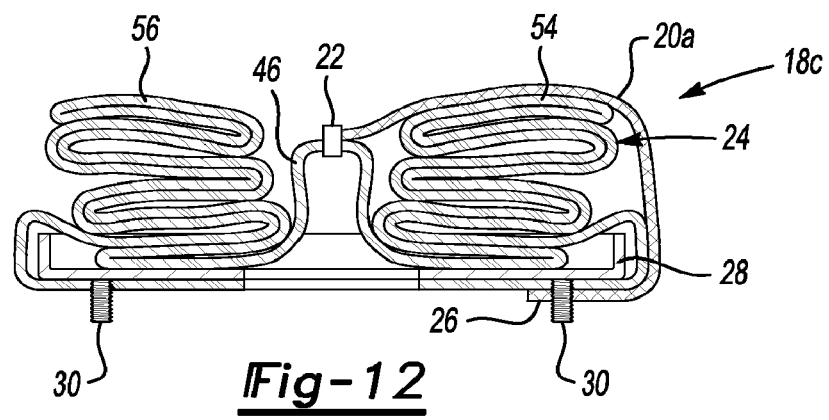
FIG. 12 is a section view of an airbag assembly according to a third alternate embodiment.

FIG. 12 is a section view of another example airbag assembly 18c in which the cushion wrap 20a is secured to the front panel portion 46 of the airbag 24, but is only secured at one end 26 to the retainer bracket 28. Thus, the first folded stack 54 is restrained by the cushion wrap 20a (which may or may not include tear seams), but the second folded stack 56 is not restrained by the cushion wrap 20a. Again this would cause the second folded stack 56 to inflate first.

Although the cushion wrap 20 is shown used in driver's side airbag assemblies 18, the cushion wrap 20 could also be used in passenger side airbag assemblies and side airbag assemblies. The cushion wrap 20 could be used to control the direction of deployment of the side airbag and passenger side airbag.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope. Alphanumeric identifiers on method steps are for convenient reference in dependent claims and do not signify a required sequence of performance unless otherwise indicated in the claims.

What is claimed is:

1. An airbag assembly comprising:
   support structure:
   an airbag having a front panel opposite a rear opening, the airbag supported by the support structure; and
   a wrap having a first portion secured to the front panel, and a second portion and a third portion secured to the support structure, the wrap including a first tear portion between the first portion and the second portion and a second tear portion between the first portion and the third portion, the first portion including a first edge and an opposite second edge, the second portion of the wrap contiguous with the first edge of the first portion and the third portion of the wrap contiguous with the second edge of the first portion, the first tear portion having a different tear strength from the second tear portion.

2. The airbag assembly of claim 1 wherein the support structure is inside the airbag.

3. The airbag assembly of claim 2 wherein the support structure includes a plurality of protrusions through a rear panel of the airbag, the wrap secured to the plurality of protrusions.

4. The airbag assembly of claim 3 wherein the plurality of protrusions are a plurality of threaded members.

5. The airbag assembly of claim 4 wherein the support structure is a bracket having an opening aligned with an opening though the rear panel of the airbag.

6. The airbag assembly of claim 5 wherein the first tear portion and the second tear portion each include a tear seam.

7. The airbag assembly of claim 6 installed on a steering wheel assembly, wherein the first tear portion is arranged toward an upper end of the steering wheel assembly and the second tear portion is arranged toward a lower end of the steering wheel assembly, the second tear portion configured to tear more easily than the first tear portion.

8. The airbag assembly of claim 7 wherein the tear seam of the second tear portion is weaker than the tear seam of the first tear portion.

9. The airbag assembly of claim 1 wherein the airbag is folded into a pair of stacks separated by portions of the front panel immediately adjacent a connection between the wrap and the front panel.

10. The airbag assembly of claim 1 wherein the first tear portion and the second tear portion each include a tear seam.

11. The airbag assembly of claim 1 wherein the first portion of the wrap is defined entirely between the second portion of the wrap and the third portion of the wrap.

12. The airbag assembly of claim 11 wherein the support structure is inside the airbag, and the support structure includes a plurality of protrusions through a rear panel of the airbag, the wrap directly secured to the plurality of protrusions.

13. An airbag assembly comprising:
    support structure having a plurality of protrusions:
    an airbag having a front panel opposite a rear opening through a rear panel, the support structure substantially inside the airbag with the protrusions extending through the rear panel of the airbag, the airbag folded into a pair of stacks on the support structure; and
    a wrap having a middle portion and a pair of side portions, the side portions each connected to the middle portion by a tear portion at one end and to at least one of the protrusions at an opposite end, the middle portion secured to the front panel, a portion of the front panel at least partially separating the pair of stacks of the airbag, wherein one of the tear portions has a greater tear strength than the other of the tear portions.

* * * * *

UNITED STATES PATENT AND TRADEMARK OFFICE
CERTIFICATE OF CORRECTION

| | |
|---|---|
| PATENT NO. | : 7,658,408 B2 |
| APPLICATION NO. | : 11/498954 |
| DATED | : February 9, 2010 |
| INVENTOR(S) | : Zofchak et al. |

It is certified that error appears in the above-identified patent and that said Letters Patent is hereby corrected as shown below:

The "Assignee" section on the patent's front page should read as follows.

(73) Assignee: Toyoda Gosei Co. Ltd., Gun Aichi (JP)

Signed and Sealed this

Eighth Day of June, 2010

David J. Kappos
*Director of the United States Patent and Trademark Office*